US007715339B2

(12) United States Patent
Sarja et al.

(10) Patent No.: US 7,715,339 B2
(45) Date of Patent: May 11, 2010

(54) PDP CONTEXT ERROR HANDLING METHOD

(75) Inventors: Jorma Sarja, Espoo (FI); Ralitsa Gateva, Kirkland, WA (US); Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 1548 days.

(21) Appl. No.: 10/510,044

(22) PCT Filed: Mar. 28, 2003

(86) PCT No.: PCT/IB03/01501

§ 371 (c)(1),
(2), (4) Date: Oct. 19, 2004

(87) PCT Pub. No.: WO03/084262

PCT Pub. Date: Oct. 9, 2003

(65) Prior Publication Data

US 2005/0154780 A1 Jul. 14, 2005

(30) Foreign Application Priority Data

Apr. 3, 2002 (GB) ................. 0207712.1

(51) Int. Cl.
*H04Q 7/00* (2006.01)
(52) U.S. Cl. .................................................. 370/328
(58) Field of Classification Search ................ 370/328, 370/356, 340, 389; 709/227, 226; 455/432.3
See application file for complete search history.

(56) References Cited

U.S. PATENT DOCUMENTS

| 6,973,076 B2 * | 12/2005 | Takeda et al. ............... 370/356 |
| 7,106,718 B2 * | 9/2006 | Oyama et al. ............... 370/340 |
| 7,209,458 B2 * | 4/2007 | Ahvonen et al. ............ 370/328 |
| 2002/0036983 A1 * | 3/2002 | Widegren et al. ........ 370/230.1 |
| 2002/0062379 A1 * | 5/2002 | Widegren et al. ........... 709/227 |
| 2002/0120749 A1 * | 8/2002 | Widegren et al. ........... 709/227 |
| 2002/0184510 A1 * | 12/2002 | Shieh ........................ 713/185 |
| 2003/0128701 A1 * | 7/2003 | Hurtta ........................ 370/389 |
| 2003/0172160 A9 * | 9/2003 | Widegren et al. ........... 709/226 |
| 2004/0116117 A1 * | 6/2004 | Ahvonen et al. ......... 455/432.3 |
| 2007/0258399 A1 * | 11/2007 | Chen ........................ 370/328 |

FOREIGN PATENT DOCUMENTS

| WO | WO 99/37103 | 7/1999 |
| WO | WO 01/41376 A2 | 6/2001 |
| WO | WO 02/085055 A2 | 10/2002 |

OTHER PUBLICATIONS

ETSI TS 123 207, V5.0.0, End to end quality of service concept and architecture, 50 pages, Jun. 2001.*

* cited by examiner

*Primary Examiner*—Frank Duong
(74) *Attorney, Agent, or Firm*—Harrington & Smith

(57) ABSTRACT

Method and apparatus for dealing with a connection context request to establish a connection between a mobile station (MS) and a network gateway element. The gateway (such as a GGSN) determines whether binding information is required, then ascertains whether such information has been supplied. If the information is not supplied, the GGSN responds to the request on the basis of a policy determined by the operator of the network. This can include, for example, rejecting the request.

34 Claims, 2 Drawing Sheets

PDP CONTEXT ERROR HANDLING METHOD

FIELD OF INVENTION

The present invention relates to the handling of error cases during requests for service within a mobile telecommunications context.

The invention has been developed primarily for use with mobile telephones and communication devices for use with third generation (UMTS) networks and will be described with reference to this application. However, it will be appreciated that the invention can be applied to other standards and protocols, including future generations.

BACKGROUND TO INVENTION

During initiation of a data or multimedia session by user equipment (UE) in a third generation telecommunication system, a PDP (Packet Data Protocol) context request is issued. As shown in FIG. 1, the PDP context request is generated in an SGSN upon receipt of a trigger from the UE. The PDP context request is sent to a Gateway GPRS Support Node (GGSN), which in turn communicates with a Policy Control Function (PCF) to ascertain what level of service and resources are authorised for that data or multimedia session. The PCF authorises (or rejects) setting up of the bearer(s) requested by the UB via the PDP context request.

If authorization of the PDP context is required (e.g. in 3GPP R5, if the PDP context request is IP Multimedia Subsystem (IMS) related), the PDP context request will usually include binding information such as an authorization token and flow identifiers. If the operator supports service based local policy (SBLP), the authorization of PDP contexts shall be performed.

During the creation or modification of a PDP context, the UE may define a traffic flow template (TFT). A TFT consists of one to eight packet filters, each identified by a unique packet filter identifier. However, as part of the SBLP authorization of the PDP context, the Policy Control Function (PCF) may send packet classifiers for flows carried by the PDP context. It is possible that the downlink packet classifiers defined by the PCF and the TFT set by the UE will have an overlap in the attributes they define.

One approach to dealing with this situation is for the GGSN to ignore either the TFT or the packet classifier. However, this approach may lead to dropping of packets or incorrect classification in the GGSN.

SUMMARY OF INVENTION

In accordance with a first aspect of the invention, there is provided a method of dealing with a connection context request to establish a connection between a mobile station (MS) and a network gateway element, the method including the steps of:
(a) receiving in the gateway element a connection context request;
(b) determining in the gateway element whether binding information is required;
(c) determining whether binding information was supplied with the connection context request; and
(d) in the event that the binding information is required and was not supplied, responding to the request on the basis of a policy determined by the operator of the network.

Preferably, step (d) includes supplying a different resource level from that requested in the connection context request in the event the binding information is required and was not supplied.

More preferably, the first aspect further includes the steps of:
(f) activating the connection context; and
(g) informing the MS that charging will differ from that associated with the resource level requested.

In a preferred form, the resource level is a Quality of Service (QoS) parameter. Typically, step (e) will involve downgrading the QoS. It is preferred that the MS be informed of the change in QoS.

In an alternative embodiment, reducing the resource level includes the step of rejecting the connection context request.

In a preferred embodiment, the context request is a packet data protocol (PDP) context request.

Preferably, the network gateway element is a serving GPRS support node (SGSN) or a gateway GPRS support node (GGSN).

In a particularly preferred embodiment, the method includes the step, prior to step (a), of providing the network gateway element with access to a list of Access Point Names (APNs) that are IP Multimedia Subsystem related, and wherein step (c) includes determining whether the connection context request refers to an APN on the list.

In a second aspect of the present invention, there is provided a method of dealing with a connection context request to establish a connection between a mobile station (MS) and a network gateway element, the method including the steps of:
(a) receiving in the network gateway element a connection context request, the connection context request including binding information and traffic flow parameters, the traffic flow parameters being indicative of intended packet filtering;
(b) sending an authorisation request from the network gateway element to a network policy control element;
(c) receiving, in the network gateway element, a packet classifier from the policy control element in response to the authorisation request, the packet classifier being intended for use by the gateway element;
(d) determining whether a conflict exists between attribute values of the traffic flow parameters and attribute values of the packet classifier; and
(e) in the event that there is a conflict, informing the MS.

Preferably, the context request is a packet data protocol (PDP) context request, and the network gateway element is a serving GPRS support node (SGSN) or a gateway GPRS support node (GGSN).

In accordance with a third aspect of the invention, there is provided mobile telecommunications network apparatus for dealing with a connection context request from a mobile station MS, the apparatus including a network gateway element configured to:
(a) receive a connection context request;
(b) determine whether binding information is required;
(c) determine whether binding information was supplied with the connection context request; and
(d) in the event that the binding information is required and was not supplied, responding to the request on the basis of a policy determined by the operator of the network.

Preferably, the apparatus is configured to supply a different resource level from that requested in the connection context request in the event the binding information is required and was not supplied.

In a preferred form, the apparatus is configured to:
(f) activate the connection context; and
(g) inform the MS that charging will differ from that associated with the resource level requested.

Preferably, the resource level is a Quality of Service (QoS) parameter. More preferably, the apparatus is configured to downgrade the QoS in step (e). Most preferably, the apparatus is configured to inform the MS of the chance in QoS.

In one embodiment, reducing the resource level includes rejecting the connection context request.

Preferably, the context request is a packet data protocol (PDP) context request, and the network gateway element is a serving GPRS support node (SGSN) or a gateway GPRS support node (GGSN).

Preferably, the network gateway element has access to a list of Access Point Names (APNs) that are IP Multimedia Subsystem related, the apparatus being configured to determine whether the connection context request refers to an APN on the list.

According to a fourth aspect of the invention, there is provided mobile telecommunication network apparatus for dealing with a connection context request from a mobile station (MS), the apparatus including a network gateway element configured to:
(a) receive a connection context request, the connection context request including binding information and traffic flow parameters, the traffic flow parameters being indicative of intended packet filtering;
(b) send an authorisation request from the network gateway element to a network policy control element;
(c) receive a packet classifier from the policy control element in response to the authorisation request, the packet classifier being intended for use by the gateway element;
(d) determine whether a conflict exists between attribute values of the traffic flow parameters and attribute values of the packet classifier; and
(e) in the event that there is a conflict, inform the MS.

Preferably, the apparatus is configured, in the event there is a conflict, to reject the connection context.

Alternatively, the apparatus is configured, in the event there is a conflict, to determine suitable traffic flow parameter values and inform the MS of those values.

In another embodiment, the apparatus is configured, in the event there is a conflict, to:
determine revised traffic flow parameter values to overcome the conflict;
accept the connection context; and
inform the MS of the revised traffic flow parameters.

The MS is preferably informed of any change to the traffic parameters via a protocol configuration option message.

Preferably, the context request is a packet data protocol (PDP) context request, and the network gateway element is a serving GPRS support node (SGSN) or a gateway GPRS support node (GGSN).

DETAILED DESCRIPTION OF PREFERRED AND OTHER EMBODIMENTS

It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service. Examples of other telecommunications systems include, without limiting to these, standards such as the GSM (Global System for Mobile communications) or various GSM based systems (such as GPRS (General Packet Radio Service), AMPS (American Mobile Phone System) or DAMPS (Digital AMPS), IMT 2000 (International Mobile Telecommunications system 2000), i-phone and the like.

Figure 1:
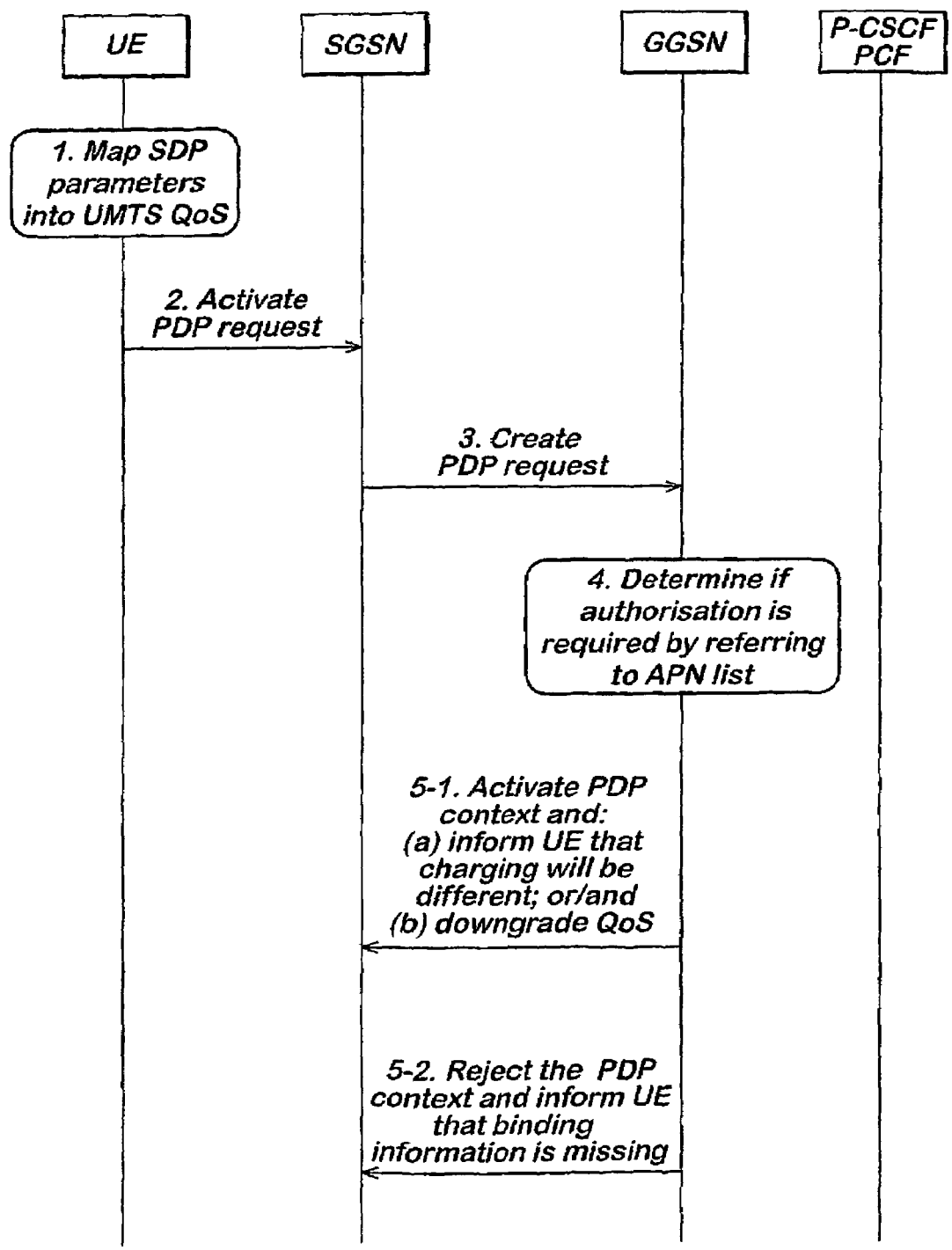
FIG. 1 is a data flow diagram showing a method of dealing with a PDP context request to establish a bearer between user equipment (UE) and a network gateway element in a third generation (3G) network, in accordance with the invention.

Referring to FIG. 1, in the first embodiment, a user equipment UE maps SDP parameters into UMTS Quality of Service (QoS) Parameters. The UE sends (step 2) a message to the SGSN, requesting activation of a connection context request in the form of a PDP context request or secondary PDP context request. The SGSN creates the PDP context request (step 3) and forwards it to a network gateway element in the form of a GGSN.

Upon receipt of the PDP context request, the GGSN ascertains whether binding information is required. It does so by looking at the Access Point Name (APN) provided in the PDP context request and comparing it to a list of APNs that require authorization (i.e. in 3GPP R5, are IMS related). In addition to the APN, requested QoS attributes, e.g. the Traffic Class, may be considered in the GGSN when determining whether authorization of the PDP context is required. If the APN and possibly the requested QoS in the PDP context request is determined to be such which requires authorization (i.e. IMS related in 3GPP R5), then the GGSN knows that binding information is required.

In the event the APN is on the list and binding information has been provided, then the GGSN can continue with the PDP context request by communicating with the Policy Control Function (PCF). In the preferred form of the invention, the PCF is implemented in the P-CSCF network element. This step is not illustrated.

In the event that the APN is on the list and possibly the requested QoS is such which requires authorization and no binding information is provided, the GGSN determines that the PDP context cannot be fulfilled as requested by the UE. The response to this situation is, in broad terms, to implement the operator's policy for dealing with such a situation, such that the UE is aware that the request cannot be fulfilled in full.

Depending upon the implementation (and, in many cases, the operator's policy), the PDP context can still be activated, but on a different basis than a PDP context which can be authorized. For example, the operator's policy can include activating the PDP context, but at a different charging rate. For different charging rates, an indication describing unauthorized PDP context may be added to Call Detailed Records (CDRs) created for the PDP context by the GGSN and possibly the SGSN. Alternatively or in addition, the QoS can be downgraded from that requested. APN specific maximum QoS attributes (e.g. one or more of the following: Traffic Class, Maximum Bitrate, Guaranteed Bitrate, Delivery Order, Maximum SDU Size, SDU Format Information, SDU Error Ratio, Residual Bit Error Ratio, Delivery of Erroneous SDUs, Transfer Delay, Traffic Handling Priority, Allocation/Retention Priority) can be configured to the GGSN. At least in the latter case (i.e. if QoS is downgraded), the UE is informed (step 5-1) of the change in a message sent from the OGSN via the SGSN. The UE may also be informed in the former case (i.e. if different charging rate is applied for the PDP context). This information can be carried either transparently (e.g. in the Protocol Configuration Options PCO information element) or non-transparently (e.g. in the GTP cause code and in the Session Management cause code) through the SGSN. The latter requires the SGSN to understand the information and to pass it to the UE.

Another option for the operator policy is to reject the PDP context and inform the UE that the binding information is missing. Again, the UE is informed (step 5-2) of the outcome either transparently or non transparently through the SGSN (as described above).

This embodiment of the invention ensures that PDP context requests are dealt with on the basis of the need for authorization, rather than simply relying upon whether or not binding information is supplied with such a PDP context request.

Figure 2:
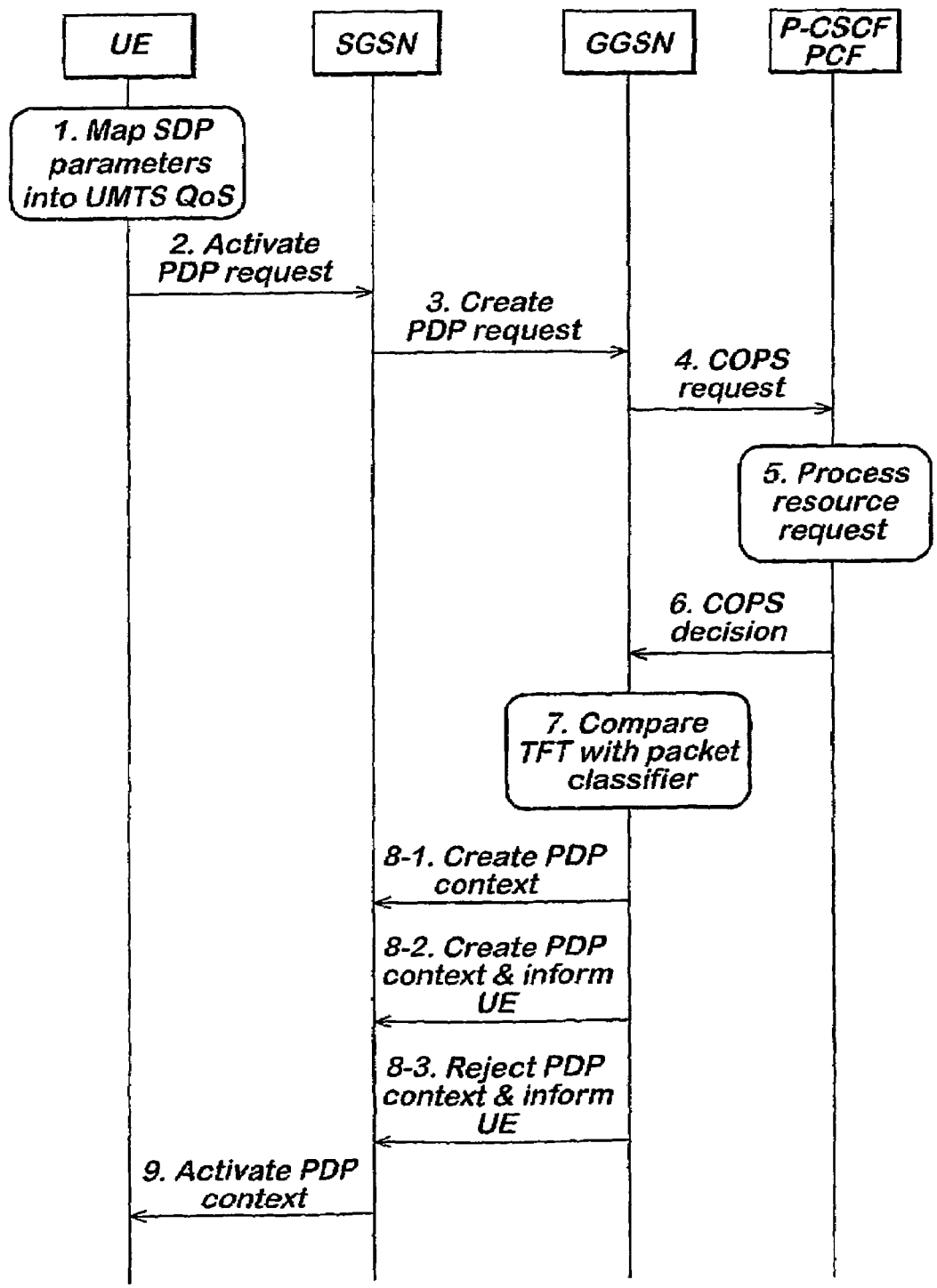
FIG. 2 is a data flow diagram showing an alternative method of dealing with a PDP context request to establish a bearer between user equipment (UE) and a network gateway element in a third generation (3G) network, also in accordance with the invention.

Turning to the second embodiment of the invention in FIG. 2, there is shown a method of dealing with a connection context request to establish a connection between a mobile station UE and a network gateway element. Again, the network gateway element is a GGSN, and the UE communicates with the GGSN via an SGSN.

Steps 2 and 3 are the same as those in the first embodiment. However, once the GGSN receives the PDP request, it communicates with a Policy Control Function (PCF) in the form of a P-CSCF to obtain authorisation for creating the PDP context. As will be understood by those skilled in the art, communication between the GGSN and the PCF takes the form of Common Open Policy Service protocol messages, preferably using the Go interface. The PDP context request in this case includes e.g. binding information, requested QoS and TFT, the TFT being indicative of intended downlink packet filtering.

As is well known to those skilled in the art, the TFT is used in the GGSN for downlink packet classification. With the help of TFTs, the GGSN can find the right PDP context to carry a downlink packet. A destination IP address is not enough for downlink packet classification, because there may exist many PDP contexts with the same destination IP address. TFTs, however, do differ in these PDP contexts.

In step 5, the PCF processes the resource request from the GGSN, and returns a decision in step 6. The decision includes a downlink packet classifier for use by the GGSN in determining the PDP context parameters. The GGSN then compares (step 7) the parameters of the downlink packet classifier with the TFT supplied by the UE. In many cases, the TFT will share parameters with the downlink packet classifier. It may also be the case that the values of the parameters may conflict with each other. If there is no conflict, then the GGSN can simply accept the PDP context request and continue with establishing the PDP context. However, if there is a conflict, it is necessary to inform the UE, because it is not possible to safely establish a PDP context that satisfies both the downlink packet classifier and TFT parameter values.

The actual information supplied to the UE, and indeed, the actual response of the GGSN to this conflict situation, depends upon the policy of the network operator responsible for the GGSN. In its simplest form, the PDP context request can be rejected by the GGSN (step 8-3) and the MS informed accordingly. However, whilst this is a valid response to the situation, and deals with the conflict issue, it is preferred to avoid simply rejecting the PDP context request out of hand.

At the very least, it is preferable to inform the MS of the reason for rejection, and even more preferable to inform the UE of the correct parameters to overcome the conflict. This information could be carried either transparently or non-transparently through the SGSN (as described above).

A preferred way of achieving a similar aim, but without rejecting the PDP context, is for the GGSN to determine the extent of the conflict and amend the TFT parameter values to reduce the conflict to an acceptable level. The PDP context can then be created on this basis (step 8-1). In this case, it is particularly desirable to inform the UE of the changed TFT parameters or of the packet classifiers received from the PCF, as this may be relevant to the user's decision as to whether to proceed with attempting to obtain the PDP context. This information could be carried either transparently or non-transparently through the SGSN (as described above).

Although the invention has been described with reference to a number of specific embodiments, it will be appreciated that the invention may be embodied in many other forms.

The invention claimed is:

1. A method, comprising:
    receiving, by a receiver, a connection context request to establish a connection between a mobile station and a gateway element of a network;
    determining, by a processor, whether binding information is required;
    determining, by the processor, whether the binding information was supplied with the connection context request; and
    when the binding information is required and was not supplied, responding, by the processor, to the request on the basis of a policy determined by the operator of the network.

2. A method according to claim 1, wherein the connection context request comprises a request for a first resource level, and wherein the responding comprises supplying a second, different resource level.

3. A method according to claim 1, further comprising:
    activating the connection context; and
    informing the mobile station that charging will differ from that associated with a resource level requested in the connection context request.

4. A method according to claim 1, wherein the connection context request comprises a request for a resource level and wherein the resource level comprises a quality of service parameter.

5. A method according to claim 4, further comprising downgrading the quality of service.

6. A method according to claim 4, further comprising informing the mobile station of the change in quality of service.

7. A method according to claim 1, comprising reducing a resource level comprising rejecting the connection context request.

8. A method according to claim 1, wherein the context request is a packet data protocol context request.

9. A method according to claim 1, wherein the network gateway element comprises a serving general packet radio service support node or a gateway general packet radio service support node.

10. A method according to claim 1, comprising, prior to the receiving of the connection context request, receiving access to a list of access point names that are internet protocol multimedia subsystem related, and wherein the determining whether the binding information was supplied with the connection context request comprises further determining whether the connection context request refers to one of the access point names on the list.

11. A method comprising:
   receiving a connection context request to establish a connection between a mobile station and a network gateway element in the network gateway element, the connection context request comprising binding information and traffic flow parameters, the traffic flow parameters being indicative of intended packet filtering;
   sending an authorization request from the network gateway element to a network policy control element;
   receiving a packet classifier from the policy control element in response to the authorization request, the packet classifier being configured for use by the gateway element;
   determining in the network gateway whether a conflict exists between attribute values of the traffic flow parameters and attribute values of the packet classifier; and
   when there is a conflict, informing the mobile station.

12. A method according to claim 11, further comprising:
   when there is a conflict, rejecting the connection context request.

13. A method according to claim 11, further comprising determining suitable traffic flow parameter values and informing the mobile station of those values, when the conflict exists.

14. A method according to claim 11, further comprising, when the conflict exists:
   determining revised traffic flow parameter values to overcome the conflict; accepting the connection context request; and
   informing the mobile station of the revised traffic flow parameters.

15. A method according to claim 13, wherein the mobile station is informed via a protocol configuration option message.

16. A method according to claim 11, wherein the context request is a packet data protocol context request.

17. A method according to claim 11, wherein the network gateway element comprises a serving general packet radio service support node or a gateway general packet radio service support node.

18. An apparatus, comprising:
   a receiver configured to receive a connection context request from a mobile station; and
   a processor configured to determine whether binding information is required, to determine whether binding information was supplied with the connection context request, and when the binding information is required and was not supplied, to respond to the request on the basis of a policy determined by the operator of the network.

19. The apparatus according to claim 18, further configured to supply a different resource level from that requested in the connection context request when the binding information is required and was not supplied.

20. The apparatus according to claim 18, further configured to:
   activate the connection context; and
   inform the mobile station that charging will differ from that associated with a resource level requested.

21. The apparatus according to claim 18, wherein the connection context request comprises a resource level request, and wherein the resource level comprises a quality of service parameter.

22. The apparatus according to claim 21, further configured to downgrade the quality of service.

23. The apparatus according to claim 21, further configured to inform the mobile station of the change in quality of service.

24. The apparatus according to claim 18, wherein reducing the resource level comprises rejecting the connection context request.

25. The apparatus according to claim 18, wherein the context request is a packet data protocol context request.

26. The apparatus according to claim 18, wherein the apparatus comprises a serving general packet radio service support node or a gateway general packet radio service support node.

27. The apparatus according to claim 18, configured to have access to a list of access point names that are internet protocol multimedia subsystem related, and the apparatus is configured to determine when the connection context request refers to one of the access point name on the list.

28. An apparatus, comprising:
   a receiver configured to receive a connection context request from a mobile station, the connection context request comprising binding information and traffic flow parameters, the traffic flow parameters being indicative of intended packet filtering;
   a transmitter configured to send an authorization request from the apparatus to a network policy control element, wherein the receiver is configured to receive a packet classifier from the policy control element in response to the authorization request, the packet classifier being intended for use by the apparatus; and
   a processor configured to determine whether a conflict exists between attribute values of the traffic flow parameters and attribute values of the packet classifier, and when there is a conflict, to inform the mobile station.

29. The apparatus according to claim 28, configured, when there is a conflict, to reject the connection context.

30. The apparatus according to claim 28, configured, when there is a conflict, to determine suitable traffic flow parameter values and informing the mobile station of those values.

31. The apparatus according to claim 28, configured, when there is a conflict, to:
   determine revised traffic flow parameter values to overcome the conflict; accept the connection context; and
   inform the mobile station of the revised traffic flow parameters.

32. The apparatus according to claim 29, configured to inform the mobile station via a protocol configuration option message.

33. The apparatus according to claim 28, wherein the context request is a packet data protocol context request.

34. The apparatus according to claim 28, wherein the apparatus comprises a serving general packet radio service support node or a gateway general packet radio service support node.

* * * * *